March 5, 1963

P. A. MUELLER 3,079,929

FILTER PLUGS FOR CIGARETTES

Filed Nov. 12, 1958

INVENTOR.
Paul Adolf Mueller

BY Michael S. Striker
Attorney

March 5, 1963  P. A. MUELLER  3,079,929
FILTER PLUGS FOR CIGARETTES
Filed Nov. 12, 1958  3 Sheets-Sheet 2

INVENTOR.
Paul Adolf Mueller
BY Michael S. Striker
Attorney

March 5, 1963 P. A. MUELLER 3,079,929
FILTER PLUGS FOR CIGARETTES
Filed Nov. 12, 1958 3 Sheets-Sheet 3
FIG. 12a
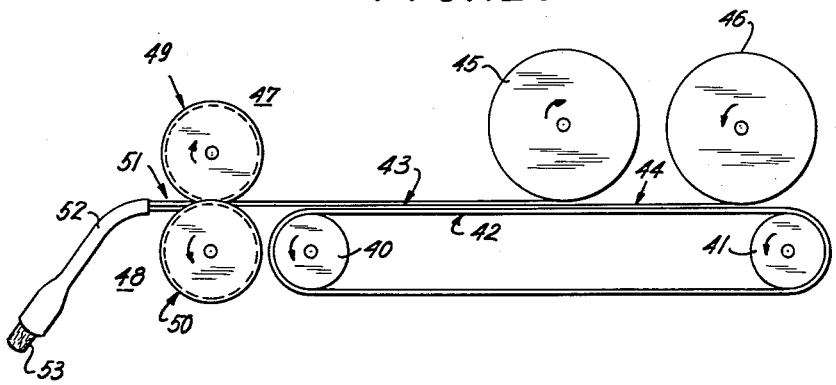
FIG. 12b
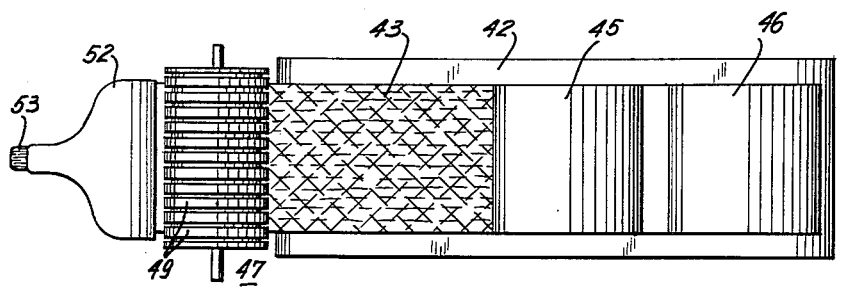
FIG. 13a
FIG. 13c
FIG. 13b
INVENTOR.
Paul Adolf Mueller
BY
Michael S. Striker
Attorney United States Patent Office 3,079,929
Patented Mar. 5, 1963

3,079,929
FILTER PLUGS FOR CIGARETTES
Paul Adolf Mueller, Rosenhuegel, Herrliberg, Switzerland
Filed Nov. 12, 1958, Ser. No. 773,421
12 Claims. (Cl. 131—208)

The present invention relates to filter plugs for cigarettes and to a method of manufacturing a filter rope from fibrous material suitable for processing into such filter plugs, and to a device for the performance of the said method. The method can preferably be employed for the manufacture of a filter rope formed of a mixture of viscose fibers and cotton and cellulose fibers respectively.

A filter rope capable of being processed into filter plugs for cigarettes can generally be produced in one of two basically different processes depending on the different raw material employed.

If a paper-type raw fibrous material is used for raw material, no difficulties are generally encountered in the processing of such material. However, the filtering action of such materials is relatively small unless they are subjected to a particular pretreatment. The pretreatment for such paper-type materials advantageously consists in a loosening of the fiber structure of the paper employed, i.e. in disintegrating the material. With such pretreatment (see, by way of example the U.S. patent specifications Nos. 2,228,383 and 2,707,960), an excellent filtering action can be obtained so that such processes have already been largely adopted in practice.

However, if the raw material employed consists of fibers and fiber bundles, the principal difficulty resides in the necessity of taking measures designed to reinforce the filter rope formed of a bundle of fibers. In the large majority of cases, a suitable binder must be employed to consolidate the fiber tufts and to protect them against sliding displacement, which involves considerable disadvantages, such as the emission in traces of solvents detrimental to health during smoking, or the influencing of the taste. If such binders are not to be employed, the fibrous material must possess a sufficiently compact structure, such as that of cotton wool or the like, from which only filter plugs having an undesirable degree of resistance to pulling can be produced.

The present invention constitutes a novel solution of the problems cited and it eliminates the former defects. It relates to a filter plug for cigarettes comprising fibers and fiber bundles and is characterized by the fact that a supporting framework formed of points of adhesion free from binders and solvents is provided between contacting fibers within the fiber bundle, the mechanical strength of the fibers located at the points of adhesion being increased at the expense of a lower adsorptive and swelling power.

The invention further relates to a method of manufacturing such filter plugs characterized by the fact that at least one wide, loose web is produced first from fibers which comprise at least a portion of such synthetic fibers which will form a point of adhesion when compressed, the said web being continuously passed between embossing means and thus consolidated by a pattern of points of adhesion between contacting fibers. The self-supporting web is then gathered transversely to the direction of travel and formed into a filter having a cross-section which is at least approximately circular.

The device according to the present invention for the performance of the said method is characterized by the presence of two mechanisms of which the first one is provided, at the beginning of a conveyor line, with a pile web fabricating unit, possesses embossing means supplied by the conveyor line and equipped with take-up devices at the end of the conveyor, while the second mechanism possesses a gathering unit arranged at the end of a conveyor line designed to change a flat pile web into a rope with a cross-section at least substantially circular, and which is designed to process the pile web delivered by the first mechanism.

A number of embodiments of the invention is described in greater detail in conjunction with the drawing in which:

FIGS. 12a, 12b are diagrammatic representations of an elevation and plan view respectively of a mechanism for producing a filter rope from a consolidated fiber web; and FIGS. 13a, 13b and 13c are diagrammatic cross-sections of fiber webs.

Figure 1:
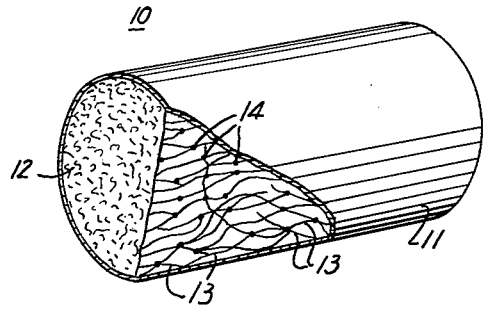
FIG. 1 is a perspective diagrammatic view of the filter plug according to the present invention.

The present filter plug 10 according to FIG. 1 as usual consists of a wrap 11 formed, by way of example, of thin paper enclosing a fiber bundle 12 having an oval or circular cross-section. As shown by the front end of the filter plug, the fibers 13 should substantially extend in the axial direction of the plug. The entire fiber bundle 12 is interspersed with a plurality of points of adhesion 14, which FIG. 1 shows only diagrammatically, between crossing or laterally contacting fibers. These points of adhesion 14 can readily be found when such a filter plug 10 is opened either before or after using, and it can be seen, e.g. by means of a magnifying glass, that the points of adhesion are produced not by bonding the contacting fibers by means of a binder or solvent but by a mechanical deformation of the fibers. Closer examination of the points of adhesion reveals that their mechanical strength is greater than that of the original fiber but that the absorptive and swelling capacity of the said points of adhesion is substantially lower than that of the fiber portions immediately adjacent such points of adhesion. Naturally, the points of adhesion are not necessarily points but may be elongated.

The fiber bundle 12 reinforced by a plurality of points of adhesion 14 distributed at random is thereby provided, as it were, with a supporting framework of mechanically stable points of adhesion which will hardly be altered when used, and with unprocessed fibrous areas in the spaces between the said framework. The fiber material in the spaces between the elements of these points of adhesion can substantially swell and become soft during use without markedly lessening the strength and stability of the fiber bundle held together by the framework of points of adhesion. Against the filter plugs so far known, the strength of the filter plug is largely independent of the changes in strength of the fibers during use. For this reason it is now also possible to employ highly absorbent fiber material and to obtain a high degree of filtering action despite low resistance to pulling.

The framework of points of adhesion within the fiber bundle further has the advantage that the smoke is positively conducted towards the highly adsorbent and/or absorbent fiber material in the spaces. In particular this highly desirable effect can be enhanced or reduced by influencing the spatial arrangement of the points of adhesion within the fiber bundle in the event of the filter plugs being produced in accordance with the method described hereunder.

For the manufacture of the filter plug according to this invention, a synthetic fiber or filament formed of viscose, i.e., a regenerated cellulosic material, is employed by way of example, which is produced from cellulose xanthate in diluted caustic soda and forced through spinnerets in the form of viscous filaments into a warm spinning bath containing strongly saline diluted sulphuric acid. The bath causes the spinning solution to be precipitated to form viscose filaments which can be cut into desired staple lengths after washing and drying.

Such viscose fibers or filaments possess, by way of example, a specific gravity of 1.5 gms./cm.$^3$ and a specific strength of 22 to 41 kg./mm.$^2$. On the other hand, cellulose acetate filaments commonly have a specific gravity of about 1.3 gms./cm.$^3$ and a specific strength of 13 to 21 kg./mm.$^2$.

The moisture absorption of such viscose fibers or filaments at 65% relative humidity amounts to about 13.5% and at 100% relative humidity to between 44 and 48% against the corresponding values of about 6.0% and 15% respectively in cellulose acetate fibers. The synthetic viscose fibers and filaments therefore display a far better absorptive capacity for moisture than cellulose acetate fibers. The reason therefor is found in the fact that the cellulose acetate fibers largely adsorb moisture at the surface only while viscose fibers absorb the liquid deposited on the surface in the interior of the fiber thereby leaving the surface free to take up more moisture.

Figure 2:
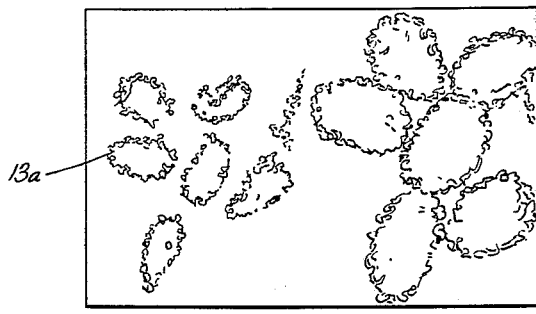
FIGS. 2 and 3 are sketched representations of microphotographs of fiber cross-sections.
Figure 3:
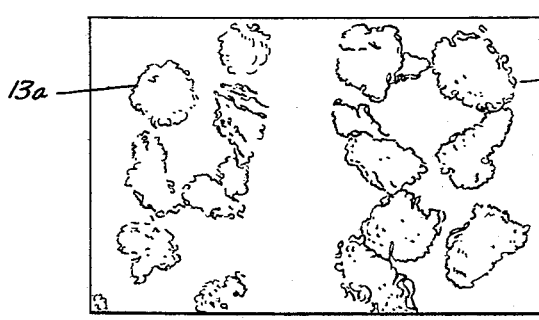

Absorption of moisture by viscose fibers or filaments can easily be checked by their swelling and the enlargement of their cross-section. By way of example, FIGS. 2 and 3 show two types of viscose filaments in cross-sections enlarged at the rate of 1:550, the left side showing a filament in the dry state as filament 13a and the right side showing the same filament in the swollen state as filament 13b. The enlargement of the cross-section, i.e. the enlargement of the surface within the outer fiber skin, is clearly visible.

Examination of filter plugs formed of such hydrophile and swelling synthetic fibers or filaments, preferably of various viscose fibers, has shown that in order to obtain a satisfactory absorption of the liquid tar and nicotine components the synthetic fibers or filaments should display an enlargement of the cross-section of at least 100 percent after swelling. Moisture absorption should amount to at least 10% and 25% respectively in an atmosphere having a relative humidity of 65% and 100% respectively.

If these rules are observed, the filter plugs formed of such synthetic or regenerated cellulosic fibers or filaments will, if the above steps are taken to strengthen the filter bundle, display an absorptive effect considerably increased beyond that of cellulose acetate fibers. In addition, the hydrophilic and swelling synthetic fibers have the great advantage over cellulose acetate fibers that they are not foreign but akin to the human organs. Any fiber particles which, during use, pass into the respiratory organs and, in particular, into the lung in the form of dust which can never be entirely eliminated, soon lose their dangerous splinter structure by swelling on the moist mucous membranes, their edges and points will become rounded, they become supple and are then similarly harmless as natural fiber lengths. When swelled, the hydrophile synthetic fibers have very little floating power, which facilitates their natural removal from the respiratory organs. The term "synthetic fibers" as used throughout the specification and claims is meant to encompass also regenerated cellulose fibers.

The hydrophilic and swelling synthetic fibers or filaments described and those of similar behaviour, however, could not readily be processed into filter plugs. Their high swelling capacity—indispensable for the increase of their absorptive power and for hygienic reasons—causes the individual fibers to be come soft, tacky and supple when such filter plugs are used, while the bundled fibers lose their shape and strength, which all results in a highly undesirable increase of the resistance to pulling. This behaviour of hydrophile synthetic fibers has so far caused them to be considered entirely unsuitable for the purpose of filtering smoke.

However, practically all these defects can be removed if the bundle of fibers or filaments forming the filter plug is stabilized by a plurality of points of adhesion between the individual fibers as described above.

A method of producing such points of adhesion is based on the fact that crossing synthetic fibers adhere to one another if the point of crossing is sufficiently compressed.

If a flat loose fiber web formed of such synthetic fibers or filaments is produced in which the fibers or filaments lie in any direction, a large number of crossing points between individual fibers corresponding to the very large number of fibers present is obtained. If a very loose fiber web formed of viscose fibers is compressed, between flat plates, vertically to the fiber web, the fiber web which could previously be transported only by means of a supporting band is changed into a markedly stiffened, self-supporting fiber web which is also fairly resistant in the transverse direction. However, a viscose fiber web so treated is too rigid and strong for the purpose of manufacturing filter plugs. A gradual consolidation of the fiber web is quite sufficient; the latter being compressed not across its entire flat width but only along a suitable flat embossing design.

Figure 4:
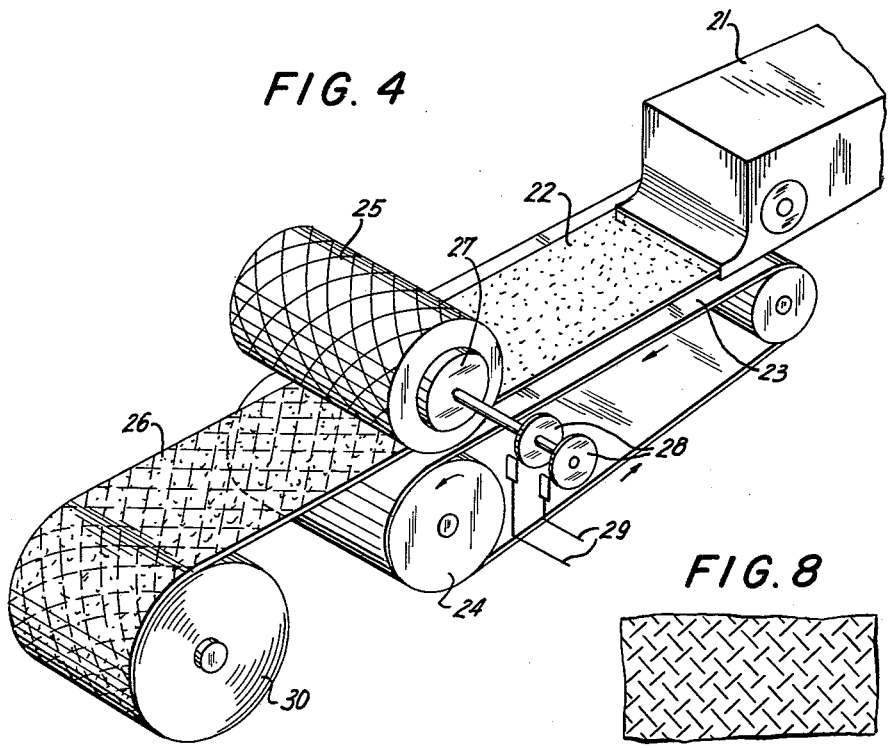
FIG. 4 is a diagrammatic view of an embodiment of a device designed to consolidate a flat material web.

The embossing design may be produced, by way of example, by means of flat dies having a ribbed pressing surface or again by means of rotating rollers having a corresponding design formed of projecting edges on the roller surface. The last-named case is represented, by way of example, in the device according to FIG. 4, all less essential details being omitted. The fiber web formed of the synthetic or regenerated cellulosic fibers such as viscose fibers is processed in the known manner by the mechanism 21. By way of example, the mechanism 21 may be designed as a card or a converter of usual design, it being of advantage for certain applications to employ relatively short-stapled material. The mechanism 21 applies a loose and thin fiber web 22 to the endless belt 23 which travels in the direction indicated by the arrow. This belt 23 passes around the roller 24 which serves as a counter-roller for an embossing roller 25. The surface of the embossing roller 25 is provided with a design of projecting irregularities, e.g. intersecting oblique ribs as indicated in FIG. 4. The roller 25 forces the fiber web 22 passing beneath it against the supporting belt 23 and the counter-roller 24 so that the embossing ribs on the circumference of the embossing roller 25 produce a corresponding embossed design visible on the consolidated and self-supporting fiber web 26 which emerges from the roller 25.

If desired, the embossing roller 25 can be heated in addition, e.g. by means of an electric heating element 27 which is supplied with heating current via the slip-rings 28 and the lines 29. Such heating of the embossing roller 25 is particularly indicated when thermoplastic synthetic fibers are employed.

The self-supporting fiber web 26 is taken up after leaving the embossing roller 25 and formed into a roll 30 by means of known take-up devices.

Figure 5:
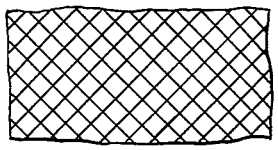
FIGS. 5 to 9 are plan views of flat fiber webs provided with an embossed design.
Figure 6:
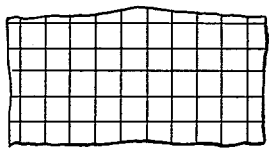
Figure 7:
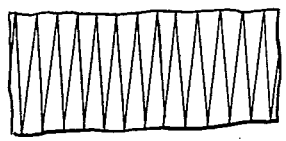
Figure 8:
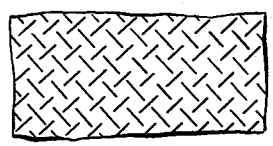
Figure 9:
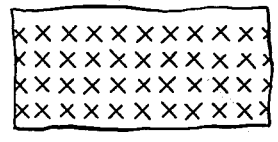

FIGS. 5 to 9 show a number of embossing designs suited to gradual consolidation of the fiber web. Although the self-supporting fiber web produced is still very loose and can be of practically any desired thinness, the surface of the web facing the embossing roller clearly shows the pressed design. This design can consist of lozenge-type intersecting lines running obliquely to the web's direction of travel as shown in FIG. 5, or of lines parallel with or normal to the longitudinal axis of the said web as shown in FIG. 6. An embossing design without intersecting lines z is shown in FIG. 7 and other line designs are represented in FIGS. 8 and 9. Essentially, any embossing design can be employed which ensures that a sufficient number of points of crossing of individual fibers or filaments disposed in random directions will be pressed together. A design comprising only embossed points is less suitable unless the fiber web is extremely dense.

It is also possible to add to the fiber web 22 formed of the described hydrophilic and swelling synthetic fibers a certain quantity of other fibers of both natural and synthetic origin. If natural fibers such as cellulose fibers, cotton fibers and the like are added, the consolidation described can also be obtained by creating a network of points of adhesion by means of embossing a design, experience showing that a natural fiber and a synthetic or regenerated cellulosic fiber such as a viscose fiber will adhere to one another at a point of crossing after embossing. Instead of natural fibers, the fiber web formed of hydrophilic and swelling synthetic or regenerated fibers may, by way of example, be given an addition of a certain quantity of synthetic fibers having a lesser swelling capacity, or of cellulose acetate fibers, which may be advantageous if the absorptive action of the hydrophilic synthetic fibers is too powerful; in this case, too, consolidation may be obtained by embossing a design. The fiber web consisting of hydrophilic and non-hydrophilic synthetic fibers may be advantageous also inasmuch as the non-swelling synthetic fibers retain their stiffness also when the filter plug is used and thus operate as a supporting framework for the softened hydrophilic synthetic fibers.

Figure 10:
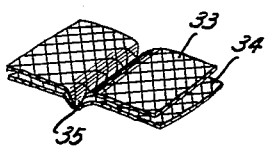
FIGS. 10 and 11 are perspective views of a two-ply and three-ply fiber web respectively.
Figure 11:
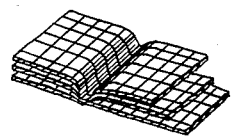

Mention should finally be made of the fact that several fiber webs consisting at least partly of hydrophilic synthetic fibers can be superposed to produce an endless filter rope. Such individual fiber webs can also be attached to one another as the two filter webs 33, 34 of FIG. 10 which have individually been provided with a design of points of adhesion, and which are interconnected by a plurality of embossing grooves oriented in the longitudinal direction of the webs according to a predetermined embossing design. Naturally, more than two fiber webs can be interconnected in this manner, as the three such webs according to FIG. 11.

An embodiment of the second unit of the mechanism for the manufacture of a filter rope suitable for processing into filter plugs is shown in FIGS. 12a and 12b. A conveyor device comprising the two rollers 40 and 41 and the conveyor band 42 is supplied with two filter webs 43 and 44 already consolidated, which are delivered by delivery rolls 45 and 46 respectively. The preceding consolidation of these loose and very thin filter webs in a first mechanism such as the one according to FIG. 4 enables such webs to be wound up and off at least once. The two superposed filter webs 43 and 44 are here supplied, by the conveyor unit, to a pair of rollers 47 and 48 which are, by way of example, equipped with a large number of meshing annular ribs 49 and 50 respectively of which the annular ribs 49 of the top roller 47 are shown in FIG. 12b. The filter web 51 emerging from between the rollers 47 and 48 passes into a gathering device 52 of known design and is there gathered into a filter rope 53 transversely to its direction of travel, the said filter rope having a circular or oval cross-section as desired.

The engaging annular ribs 49 and 50 of the two rollers 47 and 48 can be designed so that the faces of the ribs force the filter web passed beneath them against the sole surfaces of the corresponding groove in the counter-roller or that the filter web is compressed between the opposing flanks of the individual ribs of the two rollers. In the one case, a filter web having a wavy cross-section as shown diagrammatically in FIG. 13a will be produced, which is provided with consolidated areas at the highest and lowest points, which are substantially parallel with the axis of the filter web. In the second case, a wavy filter web is again obtained of which the cross-section substantially corresponds to that shown diagrammatically in FIG. 13b, in which the lateral flanks 56 of the waves are provided with consolidated areas 55 which again extend substantially parallel with the filter web axis. It is obvious that the meshing annular ribs may be replaced by other suitable surface irregularities projecting from the surface of the rollers 47 and 48, provided that care is taken for the filter web passing between them to obtain a longitudinal structure of consolidated areas. These consolidated areas need not be continuous in the longitudinal direction, but may be discontinuous. The wave-like structure of the filter web substantially resembling that shown in FIGS. 13a, 13b produced by rolling with engaging annular grooves has proved particularly advantageous because fiber material so deformed can subsequently readily be transformed into a circular filter rope 53 by the gathering device, and because this filter rope possesses, after being processed into filter plugs, particularly favourable properties. In particular, the consolidated longitudinal areas extending along the filter plug result in a further improvement of the mechanical properties of the filter plug during use, and their action complements that of the framework of points of adhesion.

If desired, a fiber web 51 may also be produced which is not wavy but possesses a cross-section substantially similar to that shown diagrammatically in FIG. 13c, i.e. which is approximately flat while still being provided with consolidated areas 55 extending in the longitudinal direction of the web.

In the diagrammatic views according to FIGS. 13a to 13c, the consolidated areas formed by compressing the fiber material are designated at 55, while the unprocessed fiber material between the said areas is designated at 56.

Attention is called to the fact that the second part of the mechanism according to FIGS. 12a, 12b constitutes only an embodiment. It is also possible to provide, instead of the two delivery rollers 45 and 46, a single such roller and to supply only one filter web to the conveyor unit. Conversely, more than two such filter webs may be superposed. If desired, the strength of the filter webs can be influenced by more than one such pair of rollers and various types of longitudinal structures be created in the filter web. Furthermore, the rollers provided to influence the filter webs may also be heated similarly to the roller 25 in the mechanism according to FIG. 4.

The present method enables a web of thin and loose fibers in which the individual fibers or fiber tufts are not interconnected to be transformed into a self-supporting fiber web of the nature of a particularly light fabric similar to a muslin bandage used for medical purposes. Instead of weaving the individual fibers, which is not possible with conventional means at the disposal of textile processes owing to the very thin fibers, the present method provides a pressing process. Accordingly, if the embossed design is selected properly, the product may be described as constituting a "pressed fabric." The novelty of the filter plugs according to this invention thus resides in the fact that when opened—prior or subsequent to use—it can be spread to form a fabric-type fiber web which constitutes the said "pressed fabric." This constitutes a characteristic difference when compared with the known filter plugs also consisting of fibers or a fiber bundle.

I claim:

1. A filter plug for cigarettes and the like, consisting essentially of superposed layers of comparatively loose fibrous material arranged so that abutting faces of said superposed layers extend in axial direction of said filter plug, each of said layers of fibrous material comprising haphazardly arranged fibers, which are adapted to absorb moisture under simultaneous swelling and which are also adapted to be mechanically deformed by compression of selected portions of the layer and thereby adhere and be joined together due to such mechanical deformation so that the compressed portions of said layer composed of said mechanically deformed fiber portions have greater mechanical strength and lesser capability of absorbing moisture and of swelling than uncompressed portions of said layer, each of said fibrous layers including a plurality of said compressed portions composed of mechanically deformed and thereby joined fiber portions extending throughout the thickness of the respective layer, thereby forming reinforcing structures which will be substantially unaffected by moisture passing through said filter plug during use of the same.

2. A filter plug for cigarettes and the like, consisting essentially of a spirally wound layer of comparatively loose fibrous material arranged so that abutting face portions of said spirally wound layer extend in axial direction of said filter plug, said layer of fibrous material comprising haphazardly arranged fibers which are adapted to absorb moisture under simultaneous swelling and which are also adapted to be mechanically deformed by compression of selected portions of the layer and thereby adhere and be joined together due to such mechanical deformation so that the compressed portions of said layer composed of said mechanically deformed fiber portions have greater mechanical strength and lesser capability of absorbing moisture and of swelling than uncompressed portions of said layer, each of said fibrous layers including a plurality of said compressed portions composed of mechanically deformed and thereby joined fiber portions extending throughout the thickness of said layer thereby forming reinforcing structures which will be substantially unaffected by moisture passing through said filter plug during use of the same.

3. A filter plug for cigarettes and the like, consisting essentially of superposed layers of comparatively loose fibrous material arranged so that abutting faces of said superposed layers extend in axial direction of said filter plug, each of said layers of fibrous material comprising haphazardly arranged viscose fibers which are adapted to absorb moisture under simultaneous swelling and which are also adapted to be mechanically deformed by compression of selected portions of the layer and thereby adhere and be joined together due to such mechanical deformation so that the compressed portions of said layer composed of said mechanically deformed fiber portions have greater mechanical strength and lesser capability of absorbing moisture and of swelling than uncompressed portions of said layer, each of said fibrous layers including a plurality of said compressed portions composed of mechanically deformed and thereby joined fiber portions extending throughout the thickness of the respective layer, thereby forming reinforcing structures which will be substantially unaffected by moisture passing through said filter plug during use of the same.

4. A filter plug for cigarettes and the like, consisting essentially of a gathered flexible web of comparatively loose fibrous material forming a plurality of folds with abutting faces of adjacent folds engaging each other and extending in axial direction of said filter plug, said web of fibrous material comprising haphazardly arranged fibers which are adapted to absorb moisture under simultaneous swelling and which are also adapted to be mechanically deformed by compression of selected portions of the web and thereby adhere and be joined together due to such mechanical deformation so that the compressed portions of said web composed of said mechanically deformed fiber portions have greater mechanical strength and lesser capability of absorbing moisture and of swelling than uncompressed portions of said web, said fibrous web including a plurality of said compressed portions composed of mechanically deformed and thereby joined fiber portions extending through the thickness of said web thereby forming reinforcing structures which will be substantially unaffected by moisture passing through said filter plug during use of the same.

5. A filter plug according to claim 1, wherein said haphazardly arranged fibers consist at least partly of synthetic fibers and filaments the cross sections of which are adapted to increase at least by 100% on swelling.

6. A filter plug according to claim 1 wherein said haphazardly arranged fibers comprise hydrophilic synthetic fibers capable of absorbing at their surfaces liquid components of tobacco smoke.

7. A filter plug according to claim 1 wherein said haphazardly arranged fibers comprise synthetic fibers with a moisture absorption of at least 10% in an atmosphere of 65% relative humidity.

8. A filter plug according to claim 1 wherein said haphazardly arranged fibers comprise synthetic fibers with a moisture absorption of at least 25% in an atmosphere of 100% relative humidity.

9. A filter plug according to claim 1 wherein said haphazardly arranged fibers comprise cellulose and viscose fibers.

10. A filter plug according to claim 9 wherein said haphazardly arranged fibers include between 5 and 50% by weight of viscose fibers.

11. A filter plug according to claim 1 wherein said haphazardly arranged fibers consist essentially of cellulose fibers and thermoplastic synthetic fibers.

12. A filter plug according to claim 1 wherein said haphazardly arranged fibers consist essentially of cellulose fibers and hydrophilic acetate fibers.

References Cited in the file of this patent

UNITED STATES PATENTS

| | | |
|---|---|---|
| 850,151 | Goldman | Apr. 16, 1907 |
| 1,409,206 | Van Nostrand | Mar. 14, 1922 |
| 2,085,293 | Buffington | June 29, 1937 |
| 2,228,383 | Berl | Jan. 14, 1941 |
| 2,464,301 | Francis | Mar. 15, 1949 |
| 2,592,470 | Ryberg | Apr. 8, 1952 |
| 2,705,686 | Ness et al. | Apr. 5, 1955 |
| 2,705,692 | Petterson | Apr. 5, 1955 |
| 2,707,960 | Janecke | May 10, 1955 |
| 2,737,997 | Himmelheber et al. | Mar. 13, 1956 |
| 2,763,267 | Müller | Sept. 18, 1956 |
| 2,801,638 | Schur et al. | Aug. 6, 1957 |
| 2,881,769 | Touey | Apr. 14, 1959 |
| 2,891,279 | Neumann | June 23, 1959 |
| 2,904,050 | Kiefer et al. | Sept. 15, 1959 |